United States Patent
Forster et al.

(10) Patent No.: US 11,498,581 B1
(45) Date of Patent: Nov. 15, 2022

(54) DRIVING ASSISTANCE SYSTEM AND DRIVING ASSISTANCE METHOD FOR A VEHICLE

(71) Applicant: Bayerische Motoren Werke Aktiengesellschaft, Munich (DE)

(72) Inventors: Yannick Forster, Munich (DE); Sebastian Hergeth, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/826,374

(22) Filed: May 27, 2022

(30) Foreign Application Priority Data

May 31, 2021 (DE) ...................... 10 2021 113 988.0

(51) Int. Cl.
*B60W 50/10* (2012.01)
*B60W 60/00* (2020.01)

(52) U.S. Cl.
CPC ........ *B60W 50/10* (2013.01); *B60W 60/0053* (2020.02)

(58) Field of Classification Search
None
See application file for complete search history.

(56) References Cited

U.S. PATENT DOCUMENTS

| | | |
|---|---|---|
| 2014/0300479 A1 | 10/2014 | Wolter et al. |
| 2015/0229727 A1 | 8/2015 | Schaefer et al. |
| 2019/0202478 A1 | 7/2019 | Gruchalski |

FOREIGN PATENT DOCUMENTS

| | | | |
|---|---|---|---|
| CN | 110182201 A | * | 8/2019 |
| DE | 10 2007 008 835 A1 | | 8/2008 |
| DE | 10 2010 009 132 A1 | | 8/2011 |
| DE | 10 2010 053 788 A1 | | 6/2012 |
| DE | 10 2012 213 965 A1 | | 2/2014 |
| DE | 10 2013 206 212 A1 | | 10/2014 |
| DE | 10 2013 018 783 A1 | | 5/2015 |
| DE | 10 2014 101 785 A1 | | 8/2015 |
| DE | 10 2015 216 484 A1 | | 3/2017 |
| DE | 10 2016 008 365 A1 | | 1/2018 |
| DE | 102018122736 A1 * | 3/2019 | ............. G07C 5/006 |

(Continued)

OTHER PUBLICATIONS

German-language Search Report issued in German Application No. 10 2021 113 988.0 dated Nov. 23, 2021 with partial English translation (11 pages).

(Continued)

*Primary Examiner* — Abdhesh K Jha
(74) *Attorney, Agent, or Firm* — Crowell & Moring LLP

(57) ABSTRACT

A driving assistance system for a vehicle, in particular a motor vehicle, includes a user interface module which is set up for interaction with a driver The user interface module is further set up to: output at least two questions in relation to a driving assistance function to the driver sequentially; and receive a user input of the driver for answering the at least two questions. A control module is set up to activate and/or operate the driving assistance function based on a composition of incorrectly answered and correctly answered questions from the at least two questions, wherein the driving assistance function is activated only when a minimum number of questions and/or a specific subgroup of the at least two questions have been answered correctly at least in part.

10 Claims, 3 Drawing Sheets

(56) References Cited

FOREIGN PATENT DOCUMENTS

| | | | |
|---|---|---|---|
| DE | 10 2018 200 731 A1 | 7/2019 | |
| DE | 10 2018 205 253 A1 | 10/2019 | |
| DE | 10 2018 216 044 A1 | 3/2020 | |
| DE | 102019007345 A1 * | 8/2020 | |
| JP | 2016162329 A * | 9/2016 | |
| WO | WO-2020057880 A1 * | 3/2020 | ............ B60W 30/08 |

OTHER PUBLICATIONS

German-language Decision to Grant issued in German Application No. 10 2021 113 988.0 dated Mar. 29, 2022 (five (5) pages).
"Rechtsfolgen zunehmenderFahrzeugautomatisierung", BundesanstaltfuerStrassenwesen (BASt) [German Federal Highway Research Institute], Forschung kompakt [Research News], Edition Nov. 2012 with English Abstract (two (2) pages).
"(R) Taxonomy and Definitions for Terms Related to Driving Automation Systems for On-Road Motor Vehicles", Surface Vehicle Recommended Practice, SAE (Society of Automotive Engineering) International, J3016TM, Sep. 2016, pp. 1-30 (30 pages).
German-language Search Report issued in German Application No. 10 2022 108936.3 dated Apr. 12, 2022, with English Translation (12 pages).

\* cited by examiner

DRIVING ASSISTANCE SYSTEM AND DRIVING ASSISTANCE METHOD FOR A VEHICLE

CROSS REFERENCE TO RELATED APPLICATION

This application claims priority under 35 U.S.C. § 119 from German Patent Application No. DE 10 2021 113 988.0, filed May 31, 2021, the entire disclosure of which is herein expressly incorporated by reference.

BACKGROUND AND SUMMARY

The present disclosure relates to a driving assistance system for a vehicle, to a vehicle having such a driving assistance system, to a driving assistance method for a vehicle and to a storage medium for executing the driving assistance method. The present disclosure relates in particular to tutorials for drivers for using driving assistance systems for automated driving.

Driving assistance systems for automated driving are becoming increasingly more important. Automated driving can be carried out at different automation levels. Exemplary automation levels are assisted, semiautomated, conditionally automated, highly automated or fully automated driving. In conditionally automated driving, the driver does not have to monitor the system continuously. The driver takes over the vehicle guidance and independently performs a lane change or lane tracking, for example. However, it must be possible for the driver to be able to take over the vehicle guidance when required within a determined advance warning time in response to a request by the driving assistance system.

The use of such driving assistance systems for automated driving often requires that a user can adequately operate said driving assistance systems. However, appropriate human-machine interfaces can be complex, which can pose difficulties for users. As a result, it may be that the driving assistance systems are not used at all or not used adequately. Particularly with inadequate use, dangerous situations in road traffic may arise on account of the lack of understanding of the user about the functioning of the driving assistance system.

DE 10 2013 018 783 A1 describes a method for operating an entertainment system in a motor vehicle. Here, drivers and passengers of the motor vehicle are entertained with a question and answer game, with the questions being able to relate to instantaneous and/or past motor vehicle data and/or environmental data. If a posed question has been answered incorrectly several times or has not been answered, the driver can be given an indication that they are obviously inattentive and parking the motor vehicle is advantageous.

DE 10 2016 008 365 A1 describes a method for controlling an assistance system of a motor vehicle. Here, a handling option resulting from a monitored driving situation is ascertained for a driver. A request for providing a function of the assistance system corresponding to the handling option is then output to the driver. The function of the assistance system is provided depending on a recorded answer of the driver in order to reduce the cognitive load on the driver.

DE 10 2018 216 044 A1 describes a method for controlling a transfer of a driving task to a driver in an automated driving vehicle which is controlled by a driver assistance system. Here, the driver assistance system identifies for example that the driver is currently not sufficiently able to take on the driving task. Subsequently, the driver assistance system starts a set of questions and answers, as a sort of speech dialogue, which is designed to ensure a safe transfer. This may involve various questions or statements for which an answer from the driver is always necessary, however.

DE 10 2014 101 785 A1 describes a system for stimulating and increasing the attentiveness and the concentration of the driver of a motor vehicle. The system is intended to stimulate the mind, in particular during long journeys with monotonous tasks, and as a result prevent the occurrence of boredom. For example, a question is transmitted acoustically or visually into the passenger compartment via an output element such that the question can be perceived by the driver or occupants. The answer to the question is fed back to the system via an input element. After the answer has been compared to the question, a reaction as to whether the question has been answered correctly or incorrectly is output via the output element.

DE 10 2013 206 212 A1 describes a method for controlling a vehicle which can be operated in an operating mode with autonomous vehicle guidance, with the driver attentiveness being monitored. Here, the driver is given cognitively demanding tasks via a human-machine interface and the driver attentiveness is determined from the response thereto. For example, provision may be made for the driver attentiveness to be considered as insufficient when there is no response within a specified time window and possibly after further warnings, whereupon the vehicle is set to a failsafe state.

DE 10 2012 213 965 A1 describes a method for ensuring sufficient performance of a driver of a motor vehicle in automated driving of the motor vehicle. According to the method, the driver is requested to carry out a respectively different task in the vehicle continuously at time intervals in automated driving. The tasks may involve answering a question which relates for example to the vehicle environment (for example what color is the car traveling ahead). The completion of the respective task is evaluated and the automation level for the automated driving is reduced or maintained depending on the evaluation.

It is an object of the present disclosure to provide a driving assistance system for a vehicle, a vehicle having such a driving assistance system, a driving assistance method for a vehicle, and a storage medium for executing the driving assistance method, which can improve the understanding of a user of the functioning of the driving assistance system. In particular, it is an object of the present disclosure to improve safety in road traffic when using driving assistance systems for automated driving.

According to an independent aspect of the present disclosure, what is specified is a driving assistance system for a vehicle, in particular a motor vehicle. The driving assistance system comprises a user interface module which is set up for interaction with a driver, wherein the user interface module is further set up to:

output at least two questions in relation to a driving assistance function to the driver sequentially; and to receive a user input of the driver for answering the at least two questions; and a control module which is set up to activate and/or operate the driving assistance function based on a composition of incorrectly answered and correctly answered questions from the at least two questions, wherein the driving assistance function is activated only when a minimum number of questions and/or a specific subgroup of the at least two questions have been answered at least partly correctly.

According to an aspect of the disclosure, the driving assistance function is enabled after a tutorial has been carried out and depending on the correct answers of the driver to questions relating to the driving assistance function. For example, in the case of incorrect answers, activation of the driving assistance function can be refused. In other words, the use of the driving assistance function can be blocked for the driver. In another example, the driving assistance function can be activated in a restricted manner in the case of some correct answers. This can ensure that the driver develops an understanding of the functioning of the driving assistance function before the driver uses the driving assistance function. As a result, safety in road traffic can be improved.

The user interface module and the control module can be implemented in a common software and/or hardware module. As an alternative, the user interface module and the control module can each be implemented in separate software and/or hardware modules.

The driving assistance system is preferably set up to carry out or output a tutorial in relation to the diving assistance function before the at least two questions are output. For example, the driving assistance system can provide information and explanations about the functioning of the driving assistance function which make it possible for the driver to answer the subsequently posed question(s).

The user interface module is preferably set up to output two or more possible answers for each question of the at least two questions to the driver. The two or more possible answers typically comprise one or more correct answers in terms of content. For example, in some embodiments, even all the answers of the two or more possible answers may be correct answers in terms of content. The two or more possible answers optionally comprise one or more incorrect or inapplicable answers in terms of content.

The two or more possible answers preferably comprise a single correct answer in terms of content.

The user input of the driver for answering the at least two questions may be a selection of at least one answer of the two or more possible answers for the corresponding question. In particular, the driver can be requested to select all of the answers which are correct in terms of content from the two or more possible answers by way of a user input. Answers which are incorrect or inapplicable in terms of content from the two or more possible answers should not be selected by way of a user input in this exemplary case. The driving assistance function can for example be blocked or can be enabled to its full extent or partly based on whether and/or how many correct answers in terms of content the driver identifies and selects.

The user interface module can be set up to output two or more possible answers for each question of the at least two questions, as described above.

The user interface module is set up to output the at least two questions to the driver sequentially. In particular, a question with the corresponding two or more possible answers can be output to the driver. After the reception of the user input for answering the question, the user interface module can then output a next question with the corresponding two or more possible answers to the driver.

The control module is set up to activate and/or operate the driving assistance function based on a composition of incorrectly answered and correctly answered questions of the at least two questions. The driving assistance function can be enabled for example to its full extent or partly based on how many correct answers the driver identifies and selects.

In some embodiments, a number or total number n of questions can be provided for a specific driving assistance function. The number n may be for example 2 or more, 5 or more, 10 or more, or even 15 or more. Only when the number n of questions has been processed can the control module activate and/or operate the driving assistance function based on the correctness of the content of the answering of the at least two questions.

For example, the control module can be set up to activate the driving assistance function (for example to its full extent) only when a minimum number m of questions have been answered correctly at least in part, preferably in full. The minimum number m of questions can in this case be the same or less than the total number n of questions. If fewer than the minimum number m of questions have been answered correctly at least in part, preferably in full, the control module can block the driving assistance function or the use of the driving assistance function by the driver. As an alternative, the control module can activate the driving assistance function in a restricted operating mode or enable the driving assistance function for use by the driver when fewer than the minimum number m of questions have been answered correctly at least in part, preferably in full.

In addition or as an alternative, the control module can be set up to activate the driving assistance function or to enable the driving assistance function for use by the driver only when a specific subgroup of the at least two questions have been answered correctly at least in part, preferably in full. For example, the specific subgroup of the at least two questions can comprise particularly relevant questions for an understanding of the functioning of the driving assistance function.

The subgroup can comprise a number p of questions, with the number p being less than the total number n of questions. When at least some of the questions of the subgroup have been answered incorrectly, the control module can block the driving assistance function. As an alternative, the control module can activate the driving assistance function in a restricted operating mode or enable the driving assistance function for use by the driver when at least some of the questions of the subgroup have been answered incorrectly.

The user interface module is preferably set up to output correct answers and/or explanations to the driver for questions answered incorrectly by the driver. In addition or as an alternative, the user interface module can be set up to output questions answered incorrectly by the driver to the driver for answering again. As a result, it is possible to achieve a learning effect in the driver and to improve an understanding of the driver of the functioning of the driving assistance function.

The control module can preferably be set up, based on a correctness of the answering of the at least two questions,
  to block the driving assistance function from activation;
  to activate it to its full extent; or
  to partly activate it.

The blocking of the driving assistance function in this case means that the driving assistance function is not activated or cannot be used by the driver. This may be the case for example when the driver has answered too few or even none of the output questions correctly.

The activation of the driving assistance function to its full extent means that the driving assistance function is not restricted in its scope of functioning or it can be used by the driver without restriction. This may be the case for example when the driver has answered all of the questions correctly.

The partial activation of the driving assistance function means that the driving assistance function can be activated and used but only in a restricted operating mode. This may be the case for example when the driver has answered a minimum amount of the questions correctly.

The control module is preferably set up to activate and/or operate the driving assistance function with at least one operating parameter which is based on the correctness of the answering of the at least two questions. For example, a maximum speed which can be set by the driver can be limited in a speed control system.

In some embodiments, the user interface module can comprise at least one display apparatus which is set up to optically output or display the at least two questions and the corresponding answers. The display apparatus can be provided for example in on the dashboard of the vehicle. The display apparatus may be for example a head unit. In some embodiments, the display apparatus comprises an LCD display, a plasma display or an OLED display.

In addition or as an alternative, the user interface module can comprise at least one loudspeaker which is set up to acoustically output the at least two questions and the corresponding answers.

The user interface module is set up to receive the user input of the driver for answering the at least two questions. The user interface module can be provided for example in or on the dashboard of the vehicle. The user interface module may be for example a head unit. In some embodiments, the user interface module comprises at least one display apparatus, such as for example a touchscreen, and/or at least one tactile operating element, such as a switch, a button and/or a rotary switch.

The driving assistance function may preferably be a driving assistance function for automated driving.

The term "automated driving" can be understood in the context of the document as driving with automated longitudinal or transverse guidance or autonomous driving with automated longitudinal and transverse guidance. Automated driving may be for example driving for a relatively long time on the freeway or driving for a limited time in the context of parking or maneuvering. The term "automated driving" comprises automated driving at any automation level. Exemplary automation levels are assisted, semi-automated, highly automated or fully automated driving. These automation levels have been defined by the German Federal Highway Research Institute (BASt) (see BASt publication "Forschung kompakt" [Research Compact], issue November 2012).

In assisted driving, the driver permanently executes the longitudinal or lateral guidance while the system takes on the respective other function within certain limits. In semi-automated driving, the system takes over the longitudinal and lateral guidance for a certain period and/or in specific situations, in which case the driver must permanently monitor the system, as during assisted driving. In highly automated driving, the system takes over the longitudinal and lateral guidance for a certain period without the driver having to permanently monitor the system; however, the driver must be able to take over the vehicle guidance in a certain time. In fully automated driving, the system can automatically manage the driving in all situations for a specific application; a driver is no longer required for this application.

The four automation levels mentioned above correspond to SAE levels 1 to 4 of the SAE J3016 standard (SAE International—previously Society of Automotive Engineering). For example, highly automated driving corresponds to level 3 of the SAE J3016 standard. Furthermore, in SAE J3016, SAE level 5 is also provided as the highest degree of automation which is not included in the definition by the BASt. SAE level 5 corresponds to driverless driving in which the system can automatically manage all situations like a human driver during the entire journey; a driver is generally no longer required.

The driving assistance function, in particular the driving assistance system, is preferably set up to implement an automation level according to SAE level 2 or SAE level 3.

SAE level 2 corresponds to semiautomation of the vehicle guidance. In the case of such semiautomation of the vehicle guidance, functions such as automatic parking, lane tracking, general longitudinal guidance, acceleration and/or braking are taken on by the driving assistance function.

SAE level 3 corresponds to conditional automation of the vehicle guidance. In the case of such conditional automation of the vehicle guidance, the driver does not have to continuously monitor the driving assistance function. The driving assistance function independently carries out functions such as triggering the turn signals, lane changing and lane tracking. However, it must be ensured that the driver is able to take over the guidance of the vehicle when required within a determined time in response to a request by the driving assistance function.

According to another independent aspect of the present disclosure, what is specified is a driving assistance method for a vehicle, in particular a motor vehicle. The driving assistance method involves sequentially outputting at least two questions in relation to a driving assistance function to the driver; receiving a user input of the driver for answering the at least two questions; and activating and/or operating the driving assistance function based on a composition of incorrectly answered and correctly answered questions from the at least two questions, wherein the driving assistance function is activated only when a minimum number of questions and/or a specific subgroup of the at least two questions have been answered at least partly correctly.

The driving assistance method can implement the aspects of the driving assistance system described in this document.

According to another independent aspect of the present disclosure, what is specified is a software (SW) program. The SW program may be set up to be executed on one or more processors in order thereby to execute the driving assistance method described in this document for a vehicle.

According to another independent aspect of the present disclosure, what is specified is a storage medium. The storage medium may comprise an SW program that is designed to be executed on one or more processors in order thereby to execute the driving assistance method described in this document for a vehicle.

According to another independent aspect of the present disclosure, software containing program code for performing the driving assistance method for a vehicle is to be executed when the software runs on one or more software-controlled apparatuses.

Other objects, advantages and novel features of the present disclosure will become apparent from the following detailed description of one or more preferred embodiments when considered in conjunction with the accompanying drawings.

BRIEF DESCRIPTION OF THE DRAWINGS

Unless indicated otherwise, the same reference signs are used for identical and functionally identical elements below.

DETAILED DESCRIPTION OF THE DRAWINGS

Figure 1:
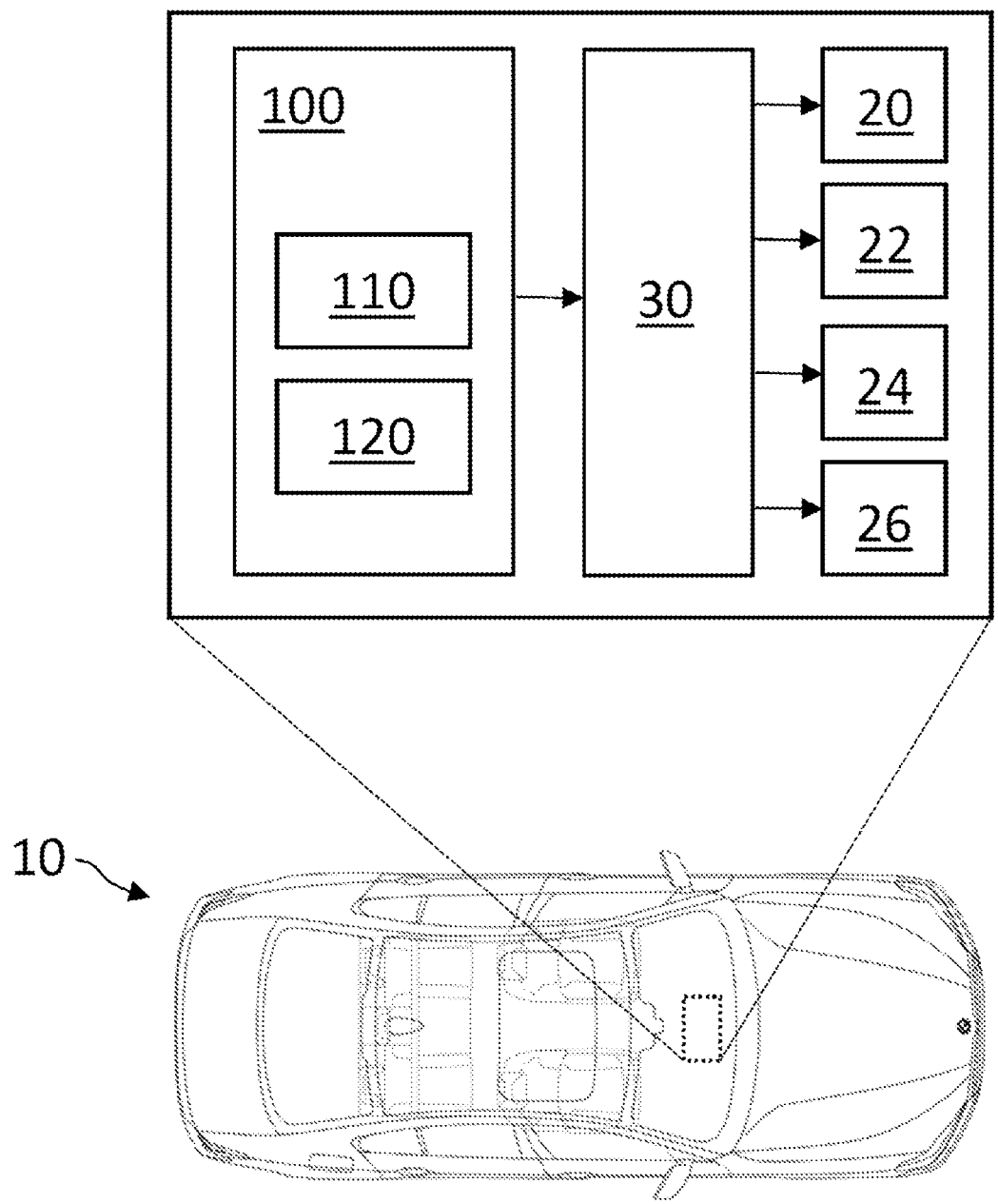
FIG. 1 schematically shows a vehicle having a driving assistance system according to embodiments of the present disclosure, FIGS. 2A and 2B schematically show a display apparatus of a user interface module according to embodiments of the present disclosure, and FIG. 3 schematically shows a flowchart of a driving assistance method according to embodiments of the present disclosure.

FIG. 1 schematically shows a vehicle 10 having a driving assistance system 100 according to embodiments of the present disclosure.

The driving assistance system 100 comprises a user interface module 110 which is set up for interaction with a driver, wherein the user interface module 110 is further set up to:

output at least two questions in relation to a driving assistance function 30 to the driver sequentially; and to receive a user input of the driver for answering the at least two questions; and a control module 120 which is set up to activate and/or operate the driving assistance function 30 based on a correctness of the content of the answering of the at least two questions.

Although the driving assistance system 100 and the driving assistance function 30 are illustrated as separate in the example of FIG. 1, it should be understood that the driving assistance function 30 may be integrated in the driving assistance system 100.

In some embodiments, the driving assistance function 30 can be set up for automated driving of the vehicle 10, for example according to SAE level 2 or SAE level 3. In particular, the driving assistance system 100 can implement the driving assistance function 30 and therefore may be a driving assistance system for automated driving.

In automated driving, the longitudinal and/or lateral guidance of the vehicle 10 is carried out automatically. The driving assistance system 100 or the driving assistance function 30 thus takes on the vehicle guidance. To this end, the driving assistance system 100 or the driving assistance function 30 controls the drive 20, the gear mechanism 22, the hydraulic operating brake 24 and the steering system 26 via intermediate units, which are not illustrated.

In order to plan and carry out automated driving, environmental information from an environmental sensor system which monitors the vehicle environment is received by the driving assistance system 100 or the driving assistance function 30. In particular, the vehicle can comprise at least one environmental sensor which is set up to record environmental data which indicate the vehicle environment. The at least one environmental sensor can comprise for example one or more LiDAR systems, one or more radar systems, one or more cameras and/or one or more laser scanners.

In this case, automated driving can be enabled by the driving assistance system 100 only when the driver has answered the questions at least partly or sufficiently correctly.

Figure 2A:
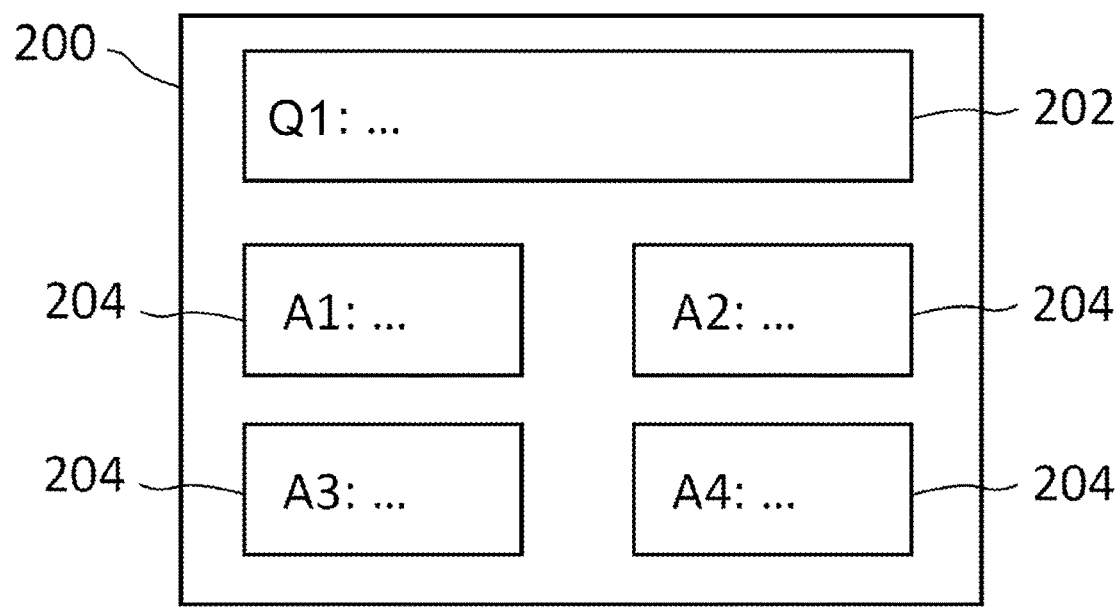
Figure 2B:
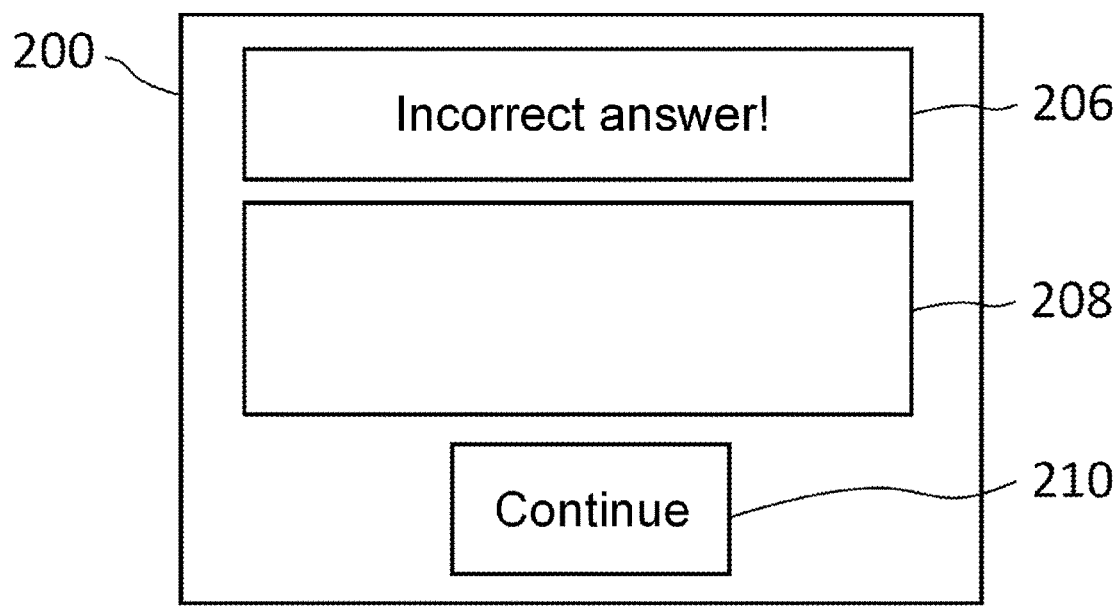

FIGS. 2A and 2B schematically show a display of a user interface module with a display apparatus 200 according to embodiments of the present disclosure.

In some embodiments, the display apparatus 200 can comprise a touchscreen or be a touchscreen which can output at least two questions in relation to a driving assistance function to the driver sequentially and receive a user input of the driver for answering the at least two questions.

With reference to FIG. 2A, the display apparatus 200 shows a question 202 in relation to a functioning of a driving assistance function. In addition, the display apparatus 200 shows four possible answers 204 for the question 202. The four possible answers 204 comprise one or more correct answers in terms of content which the driver can select for example by touching a display area of the corresponding answer 204.

The text which follows shows an example of a question and corresponding answers:

Question: You are driving manually and would now like to drive in a highly automated manner using the freeway autopilot. How do you proceed?

Answer 1: Button X activates the freeway autopilot as soon as you are on the freeway.

Answer 2: I accelerate to the minimum speed of 120 km/h and press the button X.

Answer 3: I wait for the availability icon in the instrument cluster. As soon as it is shown, I activate the freeway autopilot using the button X.

Answer 4: I press the button Y to request the availability of the freeway autopilot. If the freeway autopilot is available, I press the button X.

If the driver selects an incorrect answer (for example answer 2, answer 3 or answer 4), the display apparatus 200 as shown in FIG. 2B can output a corresponding notification 206 ("Incorrect answer!" or "Unfortunately that was incorrect") to the driver. The display apparatus 200 can optionally output an explanation 208 in relation to the incorrect answer. The explanation 208 can comprise for example a clarification and/or a correct answer to the question (for example "No minimum speed is required to activate the freeway autopilot" for answer 2).

If the driver selects a correct answer (for example answer 1), the display apparatus 200 can likewise output a corresponding notification 206 ("Correct answer!" or "That was correct") to the driver. The display apparatus 200 can optionally output an explanation 208 in relation to the correct answer. The explanation 208 can comprise for example a clarification and/or a repetition of the correct answer to the question (for example "As soon as you are on a section of road on which the freeway autopilot is available, it can be activated using the button X" for answer 1).

The driver can confirm they have taken note of the notification 206 and/or the explanation 208 through a user input in a specific region 210 of the display apparatus 200. If the driver has selected the incorrect answer, the same question can be output to the driver again following the confirmation and the driver can be provided with a new opportunity to select the correct answer. As an alternative, another or next question can be output to the driver if the driver selects the incorrect answer. However, if the driver has selected the correct answer, another or next question can be output immediately.

In particular, the driving assistance system can output at least two questions to the driver sequentially for answering before the driving assistance function is blocked or enabled. Similarly to FIG. 2A, the driving assistance system can output two or more possible answers for each question of the at least two questions for the driver to answer.

The driving assistance system is set up to activate and/or operate the driving assistance function based on a composition of incorrectly answered and correctly answered questions of the at least two questions. The driving assistance function can be enabled for example to its full extent or partly based on how many correct answers the driver identifies and selects.

In particular, a number or total number n of questions can be provided for a specific driving assistance function, said questions being output to the driver sequentially for answering. The number n may be for example 2 or more, 5 or more, 10 or more, or even 15 or more. Only when the number n of questions has been processed can the driving assistance function be activated and/or operated based on the correctness of the content of the answering.

For example, the driving assistance function can be activated (for example to its full extent) only when a minimum number m of questions have been answered correctly at least in part, preferably in full. The minimum number m of questions can in this case be the same or less than the total number n of questions. The driving assistance function can be blocked when fewer than the minimum number m of questions have been answered correctly at least in part, preferably in full. As an alternative, the driving assistance function can be activated in a restricted operating mode when fewer than the minimum number m of questions have been answered correctly at least in part, preferably in full.

In addition or as an alternative, the driving assistance function can be activated only when a specific subgroup of the at least two questions have been answered correctly at least in part, preferably in full. For example, the specific subgroup of the at least two questions can comprise particularly relevant questions for an understanding of the functioning of the driving assistance function.

The subgroup can comprise a number p of questions, with the number p being less than the total number n of questions. When at least some of the questions of the subgroup have been answered incorrectly, the control module can block the driving assistance function from use by the driver. As an alternative, the control module can activate the driving assistance function in a restricted operating mode when at least some of the questions of the subgroup have been answered incorrectly.

The control module can preferably be set up, based on a correctness of the content of the answer to the at least two questions, to block the driving assistance function from activation, to activate it to its full extent or to partly activate it.

The blocking of the driving assistance function in this case means that the driving assistance function is not activated or cannot be used by the driver. This may be the case for example when the driver has answered too few or even none of the output questions correctly.

The activation of the driving assistance function to its full extent means that the driving assistance function is not restricted in its scope of functioning or it can be used by the driver without restriction. This may be the case for example when the driver has answered all of the questions correctly.

The partial activation of the driving assistance function means that the driving assistance function can be activated and used but only in a restricted operating mode. This may be the case for example when the driver has answered a minimum amount of the questions correctly.

In some embodiments which can be combined with other embodiments described here, the driving assistance system can be set up to carry out or output a tutorial in relation to the driving assistance function before the at least two questions are output. For example, the driving assistance system can provide information and explanations about the functioning of the driving assistance function which make it possible for the driver to answer the subsequently posed question(s).

Figure 3:
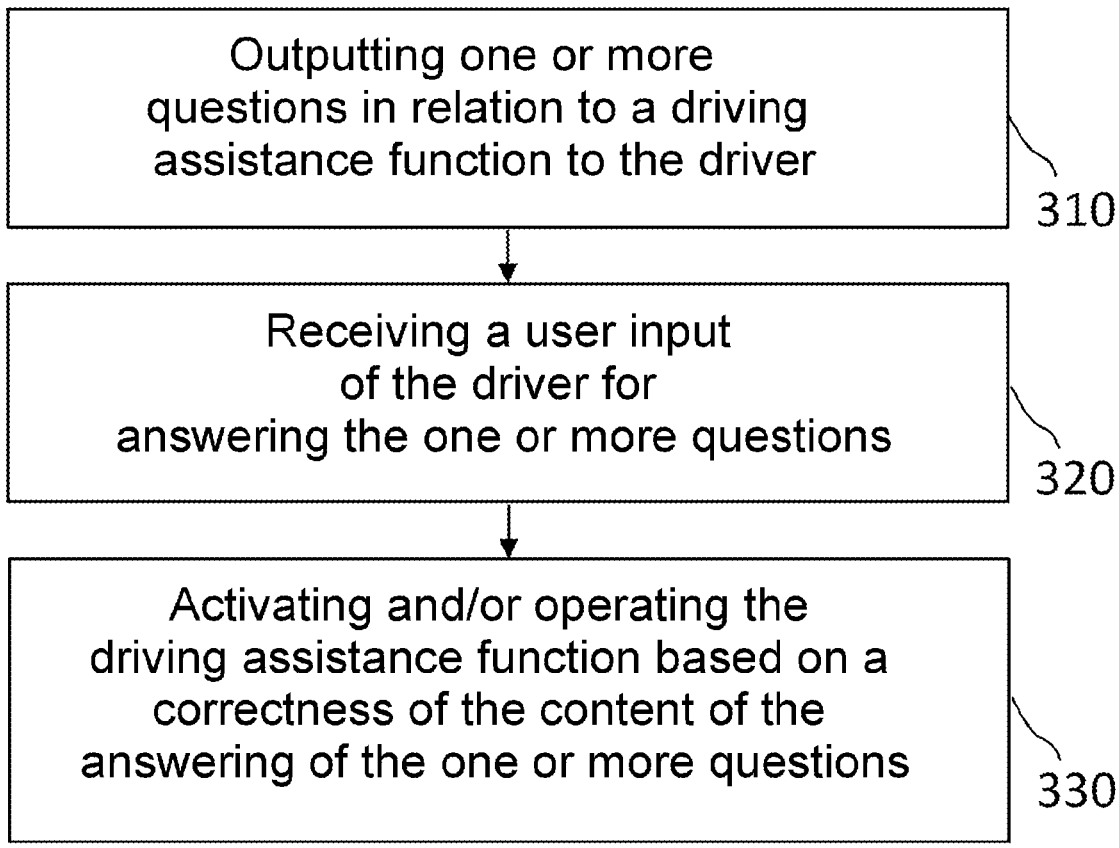

FIG. 3 shows a flowchart of a driving assistance method 300 according to embodiments of the present disclosure. The driving assistance method 300 may be implemented by appropriate software which is able to be executed by one or more processors (for example a CPU).

The driving assistance method 300 involves in block 310 outputting one or more questions in relation to a driving assistance function to the driver; in block 320 receiving a user input of the driver for answering the at least two questions; and in block 330 activating and/or operating the driving assistance function based on a correctness of the contents of the answering of the at least two questions.

According to the present disclosure, the driving assistance function is enabled after a tutorial has been carried out and depending on the correct answers of the driver to questions relating to the driving assistance function. For example, in the case of incorrect answers, activation of the driving assistance function can be refused. In other words, the use of the driving assistance function can be blocked for the driver. In another example, the driving assistance function can be activated in a restricted manner in the case of some correct answers. This can ensure that the driver develops an understanding of the functioning of the driving assistance function before the driver uses the driving assistance function. As a result, safety in road traffic can be improved.

Although the invention has been explained and illustrated in more detail through preferred exemplary embodiments, the invention is not restricted to the disclosed examples and other variations may be derived therefrom by a person skilled in the art without departing from the scope of protection of the invention. It is therefore clear that there are a multiplicity of variation options. It is likewise clear that embodiments mentioned by way of example actually only constitute examples that should not be understood in any way as limiting for instance the scope of protection, the application options or the configuration of the invention. On the contrary, the above description and the description of the figures give a person skilled in the art the ability to implement the exemplary embodiments in specific terms, wherein a person skilled in the art with knowledge of the disclosed concept of the invention may make numerous modifications, for example with regard to the function or the arrangement of the individual elements mentioned in an exemplary embodiment, without departing from the scope of protection defined by the claims and their legal counterparts, such as for instance further explanations in the description.

What is claimed is:

1. A driving assistance system for a vehicle, comprising:
  a user interface module which is configured to interact with a driver, wherein the user interface module is further configured to:
    output at least two questions in relation to a driving assistance function to the driver sequentially; and
    receive a user input of the driver for answering the at least two questions; and
  a control module which is configured to activate and/or operate the driving assistance function based on a composition of incorrectly answered and correctly answered questions from the at least two questions, wherein the driving assistance function is activated only when a minimum number of questions and/or a specific subgroup of the at least two questions have been answered correctly at least in part.

2. The driving assistance system according to claim 1, wherein
  the user interface module is configured to output two or more possible answers for each question of the at least two questions to the driver, wherein the user input of the driver for answering the at least two questions is a selection of at least one answer of the two or more possible answers for the corresponding question.

3. The driving assistance system according to claim 1, wherein
the control module is configured to enable the driving assistance function to its full extent or partly based on how many correct answers the driver identifies and selects.

4. The driving assistance system according to claim 1, wherein
the user interface module is configured to output correct answers and/or an explanation to the driver for questions answered incorrectly by the driver and/or to output the incorrectly answered questions to the driver for answering again.

5. The driving assistance system according to claim 1, wherein the control module is configured, based on a correctness of the content of the answer to the at least two questions, to:
blocking the driving assistance function from activation;
activate it to its full extent; or
partly activate it.

6. The driving assistance system according to claim 1, wherein
the control module is configured to activate and/or operate the driving assistance function with at least one operating parameter which is based on the correctness of the content of the answering of the at least two questions.

7. The driving assistance system according to claim 6, wherein
the at least one operating parameter comprises a maximum speed which is settable by the driver, and
the control module is configured to limit the settable maximum speed depending on the correctness of the content of the answering of the at least two questions.

8. The driving assistance system according to claim 1, wherein the driving assistance function implements an automation level according to SAE Level 2 or SAE Level 3.

9. A driving assistance method for a vehicle, comprising:
sequentially outputting at least two questions in relation to a driving assistance function to the driver;
receiving a user input of the driver for answering the at least two questions; and
activating and/or operating the driving assistance function based on a composition of incorrectly answered and correctly answered questions from the at least two questions, wherein the driving assistance function is activated only when a minimum number of questions and/or a specific subgroup of the at least two questions have been answered at least partly correctly.

10. A computer product comprising a non-transitory storage medium having stored thereon program code which, when executed on one or more processors, carries out the acts of:
sequentially outputting at least two questions in relation to a driving assistance function to the driver;
receiving a user input of the driver for answering the at least two questions; and
activating and/or operating the driving assistance function based on a composition of incorrectly answered and correctly answered questions from the at least two questions, wherein the driving assistance function is activated only when a minimum number of questions and/or a specific subgroup of the at least two questions have been answered at least partly correctly.

* * * * *